(12) United States Patent
Vegas et al.

(10) Patent No.: US 12,143,652 B2
(45) Date of Patent: *Nov. 12, 2024

(54) DYNAMIC ENCODING PARAMETER ADJUSTMENT

(71) Applicant: Amazon Technologies, Inc., Reno, NV (US)

(72) Inventors: Matt Rives Vegas, Portland, OR (US); Brian J. Rundle, Portland, OR (US); Joshua Ryan Melander, Beaverton, OR (US); Darin J. Klaas, Beaverton, OR (US); Kevin Moore, Portland, OR (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/325,644

(22) Filed: May 30, 2023

(65) Prior Publication Data

US 2023/0308694 A1  Sep. 28, 2023

Related U.S. Application Data

(63) Continuation of application No. 17/542,144, filed on Dec. 3, 2021, now Pat. No. 11,722,710.

(51) Int. Cl.
*H04N 21/2343* (2011.01)
*H04N 19/40* (2014.01)
*H04N 21/2187* (2011.01)

(52) U.S. Cl.
CPC ..... *H04N 21/234309* (2013.01); *H04N 19/40* (2014.11); *H04N 21/2187* (2013.01)

(58) Field of Classification Search
CPC .......... H04N 21/234309; H04N 19/40; H04N 21/2187; H04N 19/164; H04N 21/234354;
(Continued)

(56) References Cited

U.S. PATENT DOCUMENTS

2007/0204067 A1  8/2007  Walker et al.
2015/0350726 A1  12/2015  Tan
(Continued)

OTHER PUBLICATIONS

Non-Final Office Action issued on Dec. 8, 2022 in corresponding U.S. Appl. No. 17/542,144.
(Continued)

*Primary Examiner* — Anthony Bantamoi
(74) *Attorney, Agent, or Firm* — Hogan Lovells US LLP

(57) ABSTRACT

The transcoding of a contribution feed into a plurality of output feeds in various formats can be monitored to ensure that unnecessary data is not transmitted in the contribution feed. Each output feed can be transcoded using respective values for a set of video format parameters. These values can be aggregated and analyzed to determine the lowest values for individual parameters that are being used for the various output feeds. A video encoder for the contribution feed can then dynamically modify the video format parameters used to encode the contribution feed in order to avoid encoding and transmitting data that is not actually used for these output streams, which can conserve resources such as network bandwidth, or enable those resources to be used more advantageously to send data that will actually result in higher quality video presentation in the output formats for current limitations or conditions.

20 Claims, 6 Drawing Sheets

(58) Field of Classification Search
CPC ... H04N 21/234381; H04N 21/234363; H04N 21/2402; H04N 21/2662
See application file for complete search history.

(56) References Cited

U.S. PATENT DOCUMENTS

2016/0219286 A1    7/2016   Gadepalli et al.
2018/0160160 A1    6/2018   Swaminathan et al.

OTHER PUBLICATIONS

Notice of Allowance issued on Mar. 30, 2023 in corresponding U.S. Appl. No. 17/542,144.

DYNAMIC ENCODING PARAMETER ADJUSTMENT

CROSS-REFERENCE TO RELATED APPLICATION

This application is a continuation application and claims priority to U.S. patent application Ser. No. 17/542,144, filed Dec. 3, 2021, of which is incorporated by reference herein in its entirety.

BACKGROUND

As technology continues to increase and diversify, there is a corresponding need to provide content in an increasing variety of different formats. For streaming video, this can include transcoding an encoded video stream into a number of different formats with different video format parameters, such as different resolutions and bitrates. Typically, this initial encoding is performed to attempt to retain as much of the fidelity of the original video content by utilizing the maximum possible settings for these parameters, while working within the transmission constraints of the network used to transmit the encoded content. Since the resulting transcoded video streams will often be in formats having less than the maximum values for each parameter, this results in more encoded data being initially transmitted than is actually utilized, which unnecessarily utilizes computing, memory, and network resources, and prevents that data from being utilized more advantageously to provide higher quality video output within these various constraints.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the encoding and transcoding of media content or other data into various formats. In particular, various approaches provide for the dynamic determination and adjustment of format parameters used to encode an initial media stream based, at least in part, upon the values of those format parameters that are actually utilized in output streams resulting from transcoding, or decoding and differently re-encoding, of that initial media stream into a set of output streams. A control algorithm can be used to determine, for various output streams resulting from a set of transcoders, the lowest or smallest common values for those format parameters from among those output streams. In some embodiments, this can involve the control algorithm determining the lowest value for each parameter (or at least a subset of those parameters) that would satisfy the format requirements for each output format. The control algorithm can then provide this set of common parameter values to the encoder for the initial media stream. The encoder can automatically adjust, at least to an extent permissible, the format parameters used to encode the initial contribution media stream to correspond to, or at least based on, this set of common parameter values for the various transcoded output streams. In at least some embodiments, these common values can be utilized to minimize the amount of data to be transmitted while still satisfying the format requirements for the various transcoded output streams. In other embodiments, this data savings may be used to increase the values for parameters such as color depth that may result in content of higher visual quality when displayed at the respective output formats.

Various other such functions and approaches can be used or performed as well within the scope of the various embodiments as would be apparent to one of ordinary skill in the art in light of the teachings and suggestions contained herein.

Figure 1:
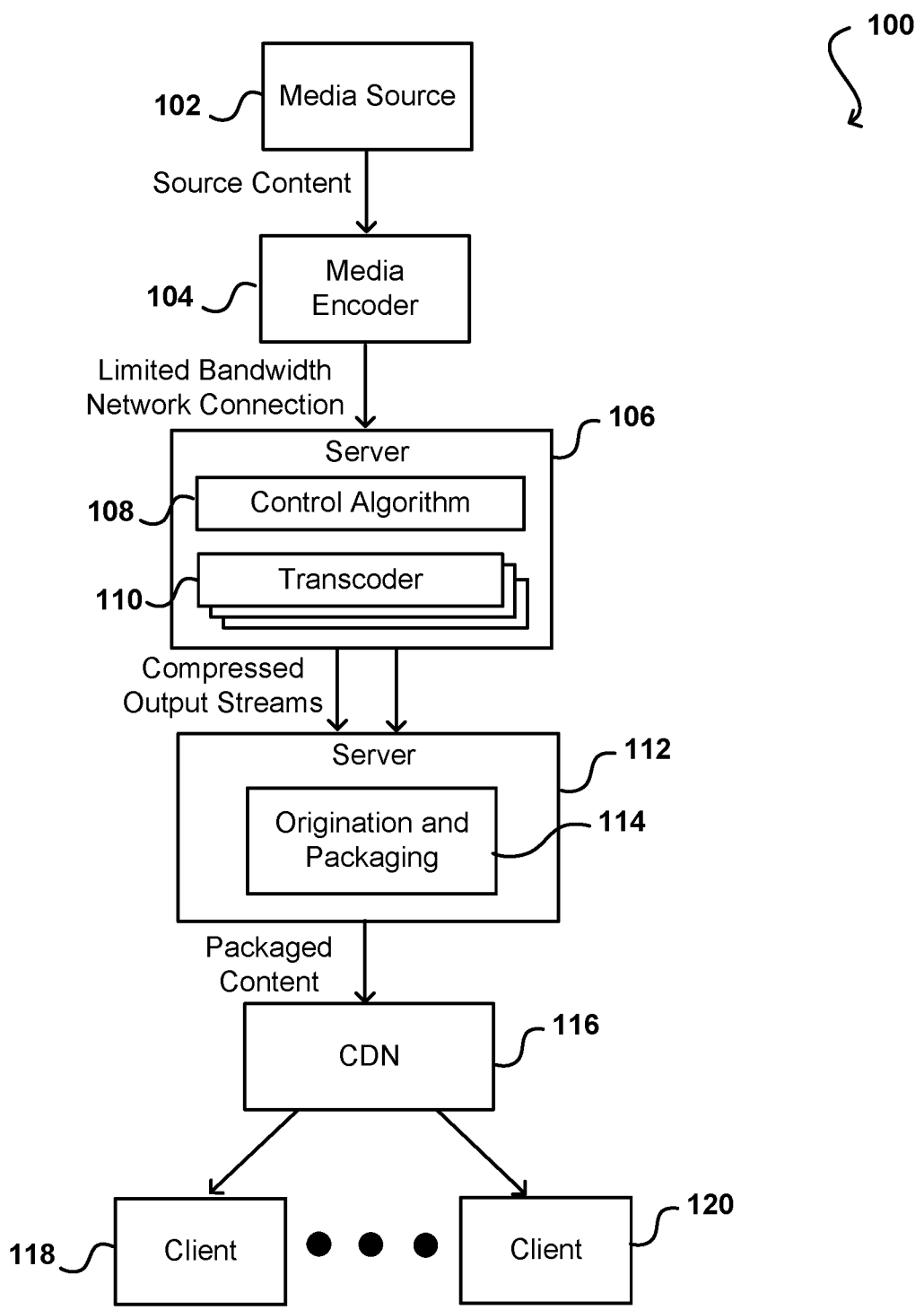
FIG. 1 illustrates an example system for encoding and transcoding streaming media that can be utilized in accordance with various embodiments.

FIG. 1 illustrates an example environment 100 in which aspects of the various embodiments can be implemented. In this example, media content (e.g., live audio and video) is captured, generated, or otherwise obtained by a media source 102. This can include, for example, live video data captured by one or more cameras. The media source 102 can transmit at least a portion of that content to a media encoder 104 for encoding into an output stream in a determined format. In some embodiments the media source 104 and the media encoder may be in the same location or connected to the same local network. In other embodiments, the content may be sent through an appropriate channel, such as across one or more wireless or broadcast networks, to be received to an appropriate address or destination, such as a network address or application programming interface (API), among other such options. In some embodiments, the media encoder 104 may be selected from a number of encoders, operating on one or more servers or a pool of electronic resources, capable of processing at least that type of content.

In this example, the media content is to be processed and delivered, or at least made available, to various client devices 118, 120 or other such recipients. These client devices may be of the same or different types, and may have similar or different capabilities, such as different display resolutions, frame rates, aspect ratios, or support for different content formats. Such devices may include, for example and without limitation, smartphones, tablet computers, desktop computers, notebook computers, televisions, set-top boxes, streaming media devices, wearable computers, virtual reality (VR) or augmented reality (AR) devices, projectors, and the like. In at least one embodiment, appropriate versions or formats of this content can be delivered to these client devices 118, 120 via a content delivery network (CDN) 116 or other content delivery system or service, as may include CloudFront from Amazon.com, Inc. In at least one embodiment, a content management and delivery service such as Elemental MediaLive from Amazon Web Services, Inc., may utilize various servers 106 to perform various content-related tasks on this source content that is to be distributed to these client devices 118, 120. In at least one embodiment, this can include at least a first server 106 with software to perform tasks such as media format conversion or transcoding, and a second server 112 with software 114 to perform tasks such as content origination and packaging. It should be understood that a resource provider such as Amazon Web Services (AWS) may provide multiple servers, or portions of multiple servers, that can provide instances of such functionality for processing different content streams. The content-processing applications on each of these servers 106, 112 may need, or at least be intended, to operate in real time, or at least near real time, for at least some types of content in order to deliver an intended experience to consumers of that content, who may access that content through one or more of the client devices 118, 120 or other such recipients. This may include, for example, the broadcasting of live events, such as sporting events or game tournaments.

In order to transmit the source content from the media source 102 to the client devices 118, 120, there are two encoding or compression steps that are performed in this example system 100, although additional or alternative steps could be utilized in other example systems and embodiments. In this example, the media encoder 104 performs a contribution encode operation on the source content that compresses live video frames into a high quality but limited bandwidth transport stream to transmit the video data to a server, which may be a cloud server provided by a resource provider in a resource provider environment in at least some embodiments. It should be understood that, as used herein, a "limited bandwidth" stream refers to a stream (or other transmission) of data that is limited in range within a band of frequencies or wavelengths, or an amount of data, that can be transmitted in a fixed about of time, often expressed in bits per second (bps) or bytes per second. The media encoder 104 can attempt to provide a highest quality video stream to be transmitted within those bandwidth constraints, such as by utilizing the maximum possible value for each of a set of video format parameters.

The encoded video stream will be received to at least one server 108 to be decoded and re-encoded, or transcoded, into one or more output formats, such as may be appropriate for, or supported by, the target client devices 118, 120 or other potential recipient devices, systems, processes, components, or applications. In at least one embodiment, these output formats may require or utilize different values for a set of format parameters, as may include parameters such as resolution, frame-rate, color depth, video codec, chroma sampling, audio channels, metadata, audio codec, audio bitrate, audio sampling rate, audio sample depth, and video bitrate, among others. For video, such video format parameters can be used to build a video adaptive bitrate (ABR) stack (also referred to as an ABR ladder) that enables the transcoded video to be presented on, or via, a variety devices and networks.

As illustrated, a server 106 may include multiple transcoders 110 that can concurrently perform transcoding of a source or primary input video stream into various output streams in different formats. In conventional systems, the media encoder 104 would attempt to retain as much fidelity of the original video as possible by configuring the maximum settings or values for various video format parameters while working within the constraints of the bandwidth limitations of the network used to transmit the primary content to the cloud server 106. Once received by the server 106, or in the cloud, this high quality contribution feed can be transcoded by the one or more transcoders 110 into many different video formats, often to formats of lesser quality corresponding to one or more lower video format parameter values. If a contribution feed's configuration setting exceeds that of all maximum aggregate output video formats in the ABR stack, then there will be some data unnecessarily transmitted in the contribution feed. This unnecessarily used bandwidth could have been used to, for example, reduce the contribution bitrate while maintaining same video quality in the ABR stack. Similarly, this wasted bandwidth could have been used to maximize video quality of the contribution feed, which could ultimately improve the quality of video produced in the ABR stack.

As an example, a contribution encoder might be capable of encoding video at a resolution of up to 8K (7,680×4,320p). The transcoders that transcode this video into output formats for may utilize resolutions of, for example, 4K (3,840×2,160p) or HD resolution (1,920×1,080p). Instead of transmitting the video content at 8K, which is not utilized for any of the output streams, the original content could instead be transmitted at a resolution of 4K, which would include sufficient data to satisfy both the 4K and HD output format requirements. Thus, the video data could be transmitted using, effectively, 75% less pixel data in 4K versus 8K, while not impacting the content of the resulting output streams. A control algorithm 108 on the server 106, or a different server or component (even the media encoder 104 in some embodiments), can aggregate and/or analyze the video parameter values that are actually used for the various output streams, and determine a value for each video format parameter that would be sufficient for all of these various output streams. The ability to avoid transmission of data that will not actually be used for the various output streams enables that bandwidth to be either conserved, or used for other purposes such as to maximize the video quality of the contribution feed and, ultimately, the ABR stack.

The control algorithm, if not contained on the media transcoder 104, can transmit these "common" parameter values to the media encoder. The media encoder in this example can be implemented in hardware and/or software, and can be able to receive and process input. This can include, for example, Internet of Things (IoT)-type functionality wherein the media encoder can receive these common format parameter values, perform processing or analysis, and adjust the corresponding parameter values used to encode the source content. These adjustments can be performed before or during transmission of at least a portion or subset of this media data, or other data to be transmitted. Such a configuration can then automate an encoding parameter determination and dynamic modification process by analyzing the ABR stack of one or more transcoders 110, determining a common or highest value actually used for individual video format parameters of all aggregate ABR video formats, and then backhauling those settings to set the configuration settings in the contribution media encoder 104.

Figure 2:
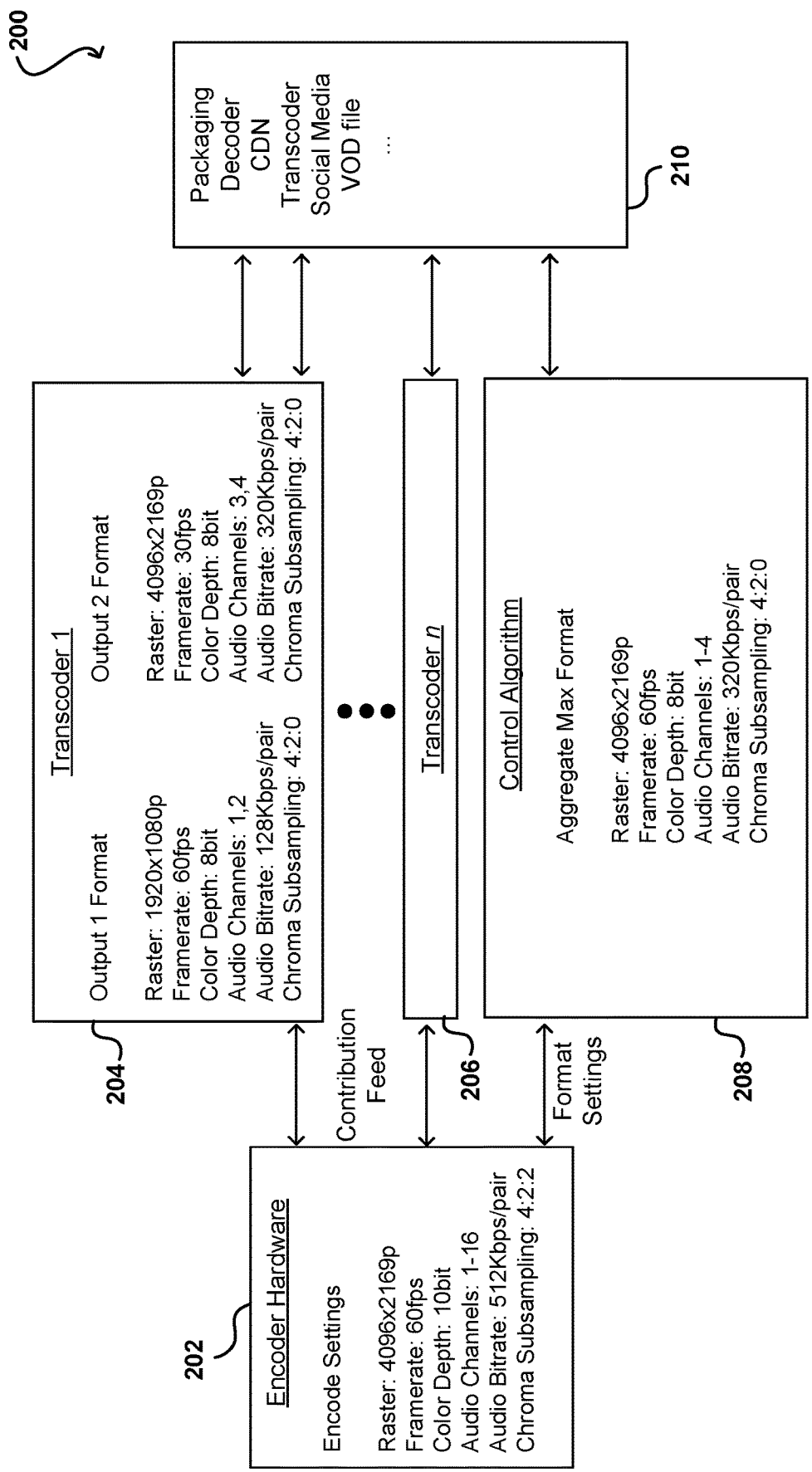
FIG. 2 illustrates components of an example system for determining and updating common values for a set of format parameters that can be utilized in accordance with various embodiments.

FIG. 2 illustrates another view of example components of a system 200 that can be used to implement aspects of various embodiments. As illustrated, this system includes encoder hardware 202, such as AWS Elemental Link, to perform a contribution encoding and provide a contribution feed. This encoder hardware may be able to provide a video feed at maximum video format parameter values as illustrated, such as 4K resolution, 60 fps framerate, and 10 bit color depth. The contribution feed may be provided to one or more transcoders, which generate output streams in various formats to be provided for further processing and distribution, as discussed elsewhere herein. Parameter values for the example output formats are illustrated in FIG. 2. These values can be provided to, or obtained by, a control algorithm 208, which here is illustrated to be logically located with the transcoders, but could logically or physically be located elsewhere such as on the encoder hardware or provided by a third party provider.

As illustrated, the resolutions for the output streams include a 4K resolution, such that the 4K value for the primary encode settings can be maintained in order to ensure sufficient data for proper transcoding. It can be noted, however, that neither output format utilizes the 10 bit color depth of the primary encode settings, and at most utilizes an 8 bit color depth, such that the control algorithm 208 can determine that an 8 bit color depth setting could be utilized instead. Similarly, the control algorithm can determine that the contribution feed can have parameter values lowered to only include four channels of audio instead of 16, a lower audio bitrate of 320 Kbps, and a lower chroma subsampling value of 4:2:0. These lower common parameter values can be passed to the encoder hardware, which can modify the encoding parameter values accordingly, such that future transmitted portions of the contribution feed can be encoded using these lower common values. As the output formats change, such as by using additional formats for new recipients or using fewer formats as recipients leave, among other potential recipient changes, the control algorithm can update the set of common parameter values and can provide these to the encoder hardware 202, such that the encoder hardware can encode the contribution feed using the lowest possible video format parameter values at any given time. There may be limits on at least some of these values, such as may relate to minimum requirements or compatible values, such that the settings for the encoder hardware may instead be set to the lowest compatible or permissible settings. As mentioned, in some embodiments these common settings may also be used to determine appropriate settings that may be different from the common settings, such as where savings in resolution might be used to transmit at a higher color depth while remaining within bandwidth limitations. This can include, for example, where output formats may be able to utilize higher values for one or more format parameters, but may have been limited by the values that were provided in the contribution feed. Thus, savings in bandwidth for one parameter may enable a higher value to be used for another parameter, which may then be utilized by one or more of the transcoders that previously could not utilize this higher parameter value because that data was not available in the contribution feed. In at least some embodiments, the encoder hardware 202 may also determine or obtain current conditions, such as network conditions, and automatically modify the parameter values based upon those conditions, such as a currently available bandwidth. Thus, the encoder hardware may take the common parameter values provided by the control algorithm and utilize those at least to an extent allowed by current network conditions.

As mentioned, in some embodiments parameter values may be provided that correspond to the target recipients or client devices as well. For example, it may be possible to determine values that are appropriate for these target devices or requested by these target devices, and use those to adjust the encoder settings for the contribution feed. This may be beneficial when a transcoder is producing output that may itself be wasting bandwidth by using parameter values that are higher than needed or utilized by the devices currently consuming the content. There may be other constraints determined as well that impact the contribution feed that can be provided, as may relate to processor or memory constraints, which may be determined by, or provided to, the encoder hardware 202 for purposes of determining optimal video format parameter values under current conditions.

It might be the case that certain devices would like or prefer to receive, or are at least capable of receiving, content with potentially higher parameter values, and if there is available bandwidth and capability of the hardware, then the settings on the encoder hardware 202 and appropriate transcoder 204 can be adjusted accordingly. Settings can come from other appropriate systems or devices as well, such as packagers, content distribution networks (CDNs), and so on. Further, there may be other types of data transmitted that may be removed from a contribution feed if not utilized for an output feed, such as metadata or any other data or related content provided in the contribution stream.

In various embodiments, the control algorithm can use aggregation and comparison logic to determine a set of parameter values to use for current conditions. This may include, for example, detecting or receiving information about a change in network or resource state that may impact available resources, such as an available amount of bandwidth or processing capacity over a current or future period of time. The control algorithm in at least some embodiments can attempt to adjust parameter values in order to get the highest possible quality given current conditions, state, availability, or other such factors as discussed and suggested herein. In other embodiments, machine learning may be used to attempt to infer an optimal set of parameters based on current network conditions, which may involve reducing one or more settings to conserve bandwidth but then increasing one or more other settings to advantageously utilize at least a portion of that bandwidth to provide higher quality output. In some embodiments, machine learning may also be used to predict optimal settings based upon changing network conditions, or anticipated recipient changes, among other such options, such that the changes are more proactive than reactive, which can provide at least some advantage in video quality and may reduce a presence of dropped frames or other such issues.

Figure 3:
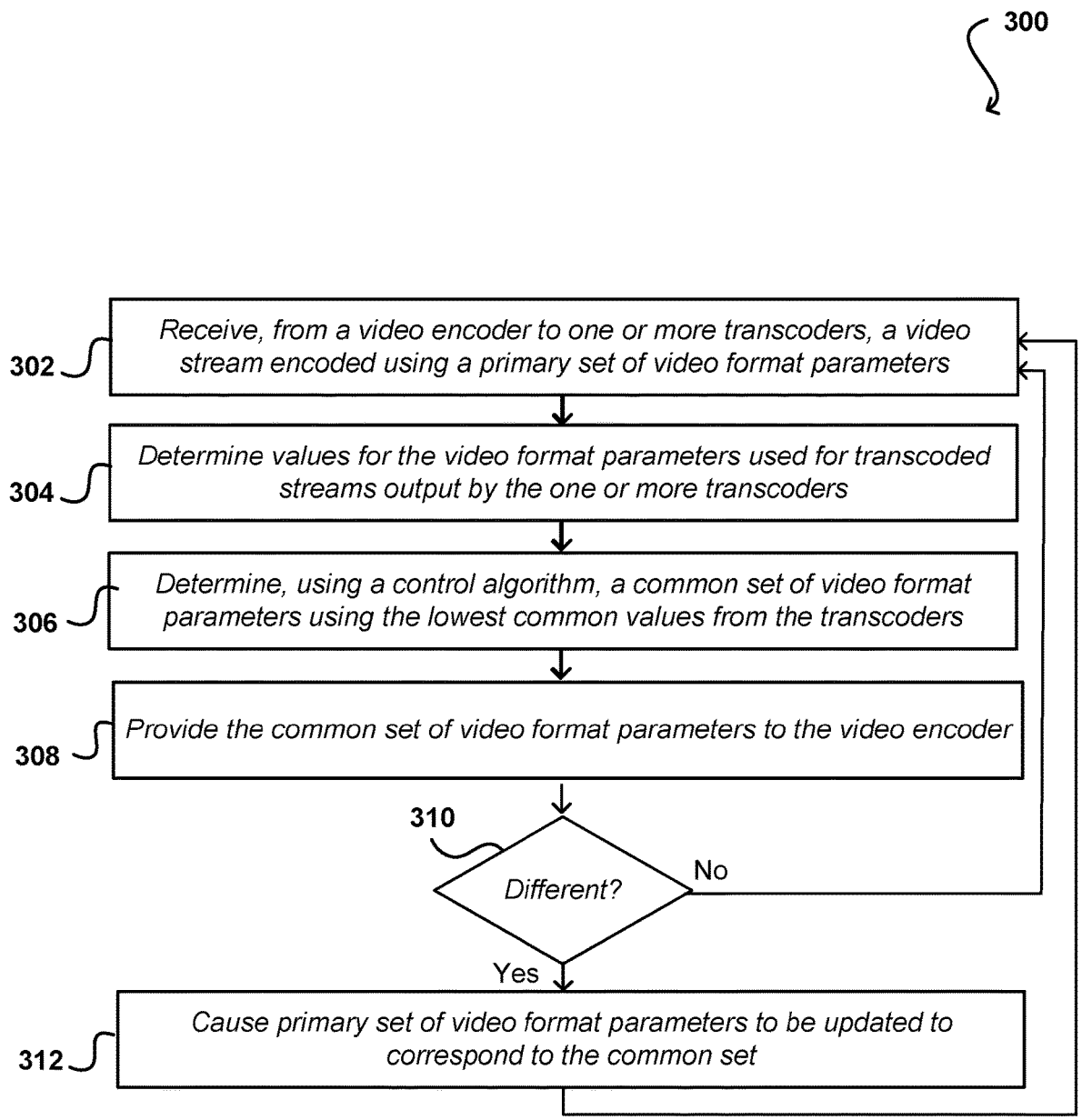
FIG. 3 illustrates an example process for modifying encoding parameters for streaming video that can be utilized in accordance with various embodiments.

FIG. 3 illustrates an example process 300 for dynamically determining and adjusting video format parameters used for a contribution video feed in accordance with various embodiments. It should be understood that for this and other processes presented herein that there can be additional, fewer, or alternative steps performed in similar or alternative orders, or at least partially in parallel, within the scope of the various embodiments unless otherwise specifically stated. Further, while this process is described with respect to the specific example of video processing, it should be understood that various other types of data that can be compressed, encoded, and/or transmitted can benefit from use of such a process in accordance with various embodiments.

In this example, a video stream is received 302 from a video encoder to one or more transcoders for transcoding into one or more different video formats. This received video stream can be encoded using a primary set of video format parameters, such as may be determined based at least in part upon current network conditions and capabilities of the video encoder. Values for these various network parameters can be determined 304 that are used for the transcoded streams that are output by the transcoder(s). In at least some embodiments, one or more of these values may be lower (or otherwise different) than those in the primary set of video format parameters. A control algorithm, or other such component or process, can be used to determine 306 a common set of video format parameters using the lowest common values utilized by these transcoders for the relevant output streams. The common set of video format parameters can be provided 308 to the video encoder. A determination can be made 310 as to whether the common set is different from the current primary set of video format parameters. If not, then the process can continue using the current primary set. If there are one or more differences, then the primary set of video format parameters used by the video encoder can be caused 312 to be updated to correspond to the common set, whether directly or at least based upon the common set for current capabilities and conditions, as well as any restrictions or policies in place for adjusting these parameter values. These adjustments can be made dynamically and automatically in at least some situations, and may occur as conditions change or output format values change.

Figure 4:
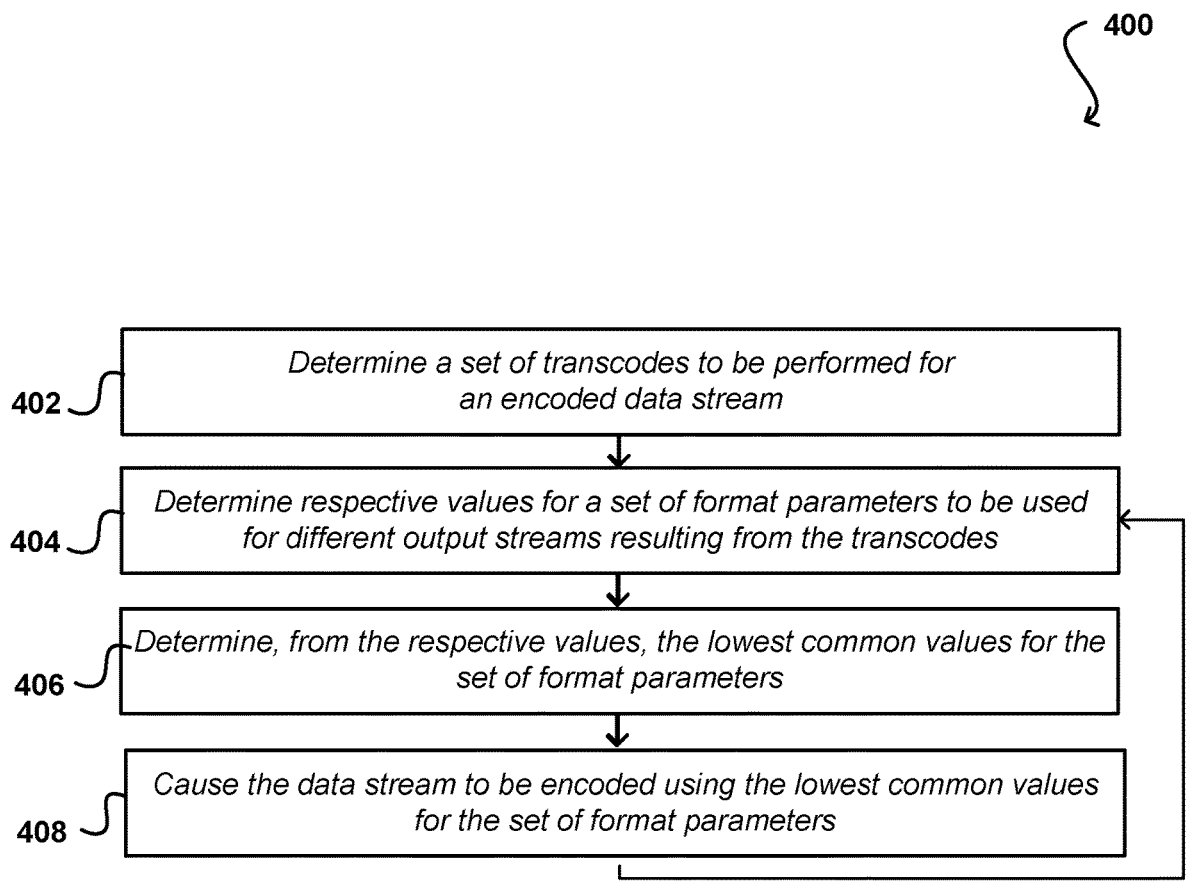
FIG. 4 illustrates an example process for setting and modifying encoding parameters that can be utilized in accordance with various embodiments.

As mentioned, parameter values can be adjusted for content or data other than video in at least some embodiments. Further, in at least some embodiments parameter values can be determined before any content or data is transmitted. FIG. 4 illustrates such an example process 400 for modifying encoding of a data stream that can be utilized in accordance with various embodiments. In this example, a set of transcodes is determined 402 that are to be performed for an encoded data stream, such as a contribution data stream. Respective values for a set of format parameters can be determined 404 that are to be used for different output streams resulting from the transcodes. The lowest common values can be determined 406, from these respective values, for the set of format parameters. This can include, for example, the lowest values that will satisfy or provide sufficient data for each of the various output streams. The initial data stream, or contribution data stream, can then be caused 408 to be encoded using the lowest common values for the set of format parameters. As mentioned, there may be some restrictions in place on these values, such that the contribution stream may instead be caused to be encoded using the lowest possible or permissible values for the set of format parameters. In some embodiments, one or more of these parameter values may instead be increased in order to improve quality of the output streams within network, processing, and memory limitations.

Figure 5:
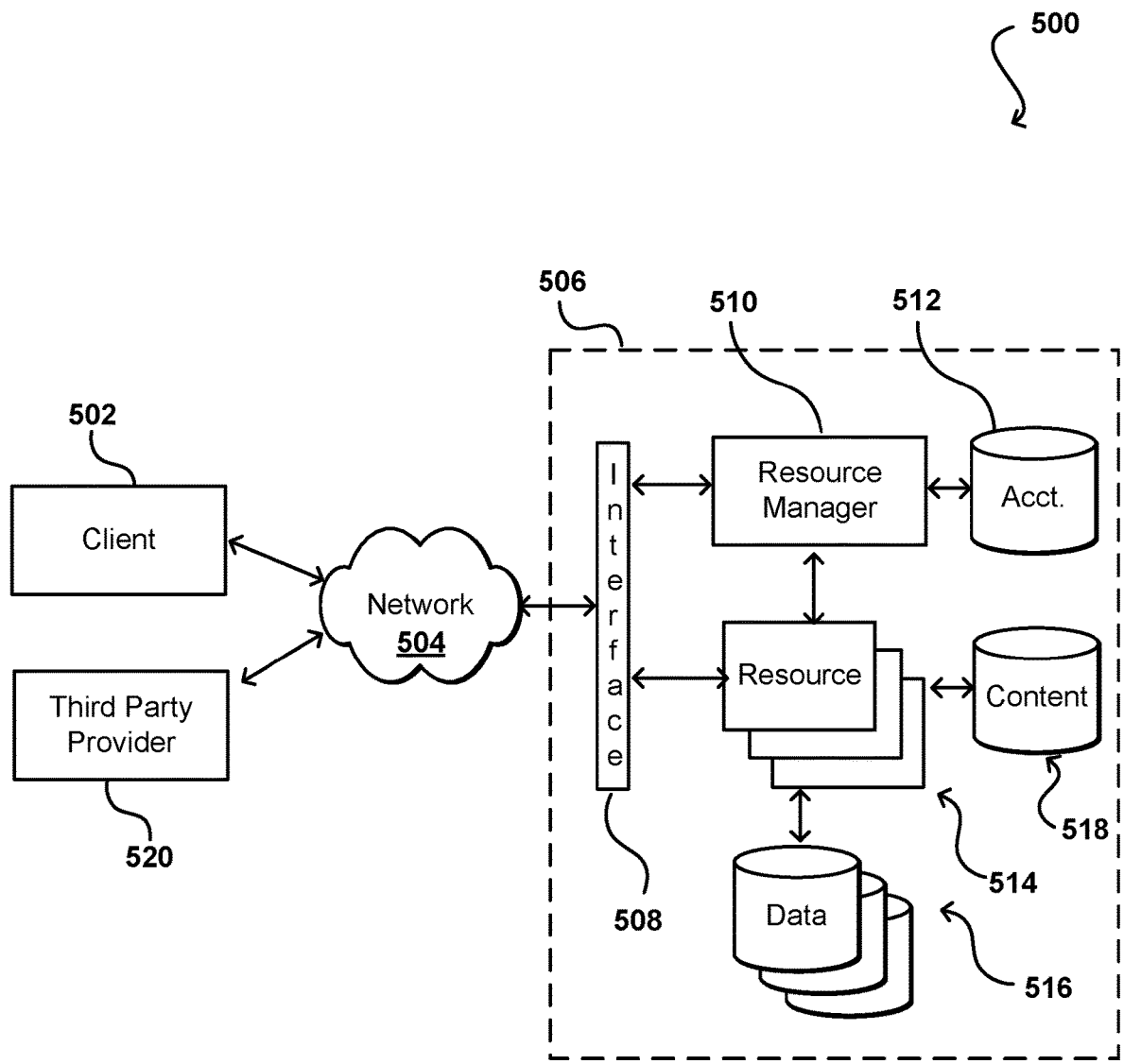
FIG. 5 illustrates an example resource environment in which aspects of various embodiments can be implemented.

FIG. 5 illustrates an example environment 500 in which aspect of various embodiments can be implemented. Such an environment can be used in some embodiments to provide resource capacity for one or more users, or customers of a resource provider, as part of a shared or multi-tenant resource environment. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 506 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request relating to a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user or otherwise as warranted by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures. In at least some embodiments, the processing of the request may cause results to be generated using data or content from a third party provider 520, results to be provided to that provider, or at least a portion of the functionality for the request performed by the third party provider.

Figure 6:
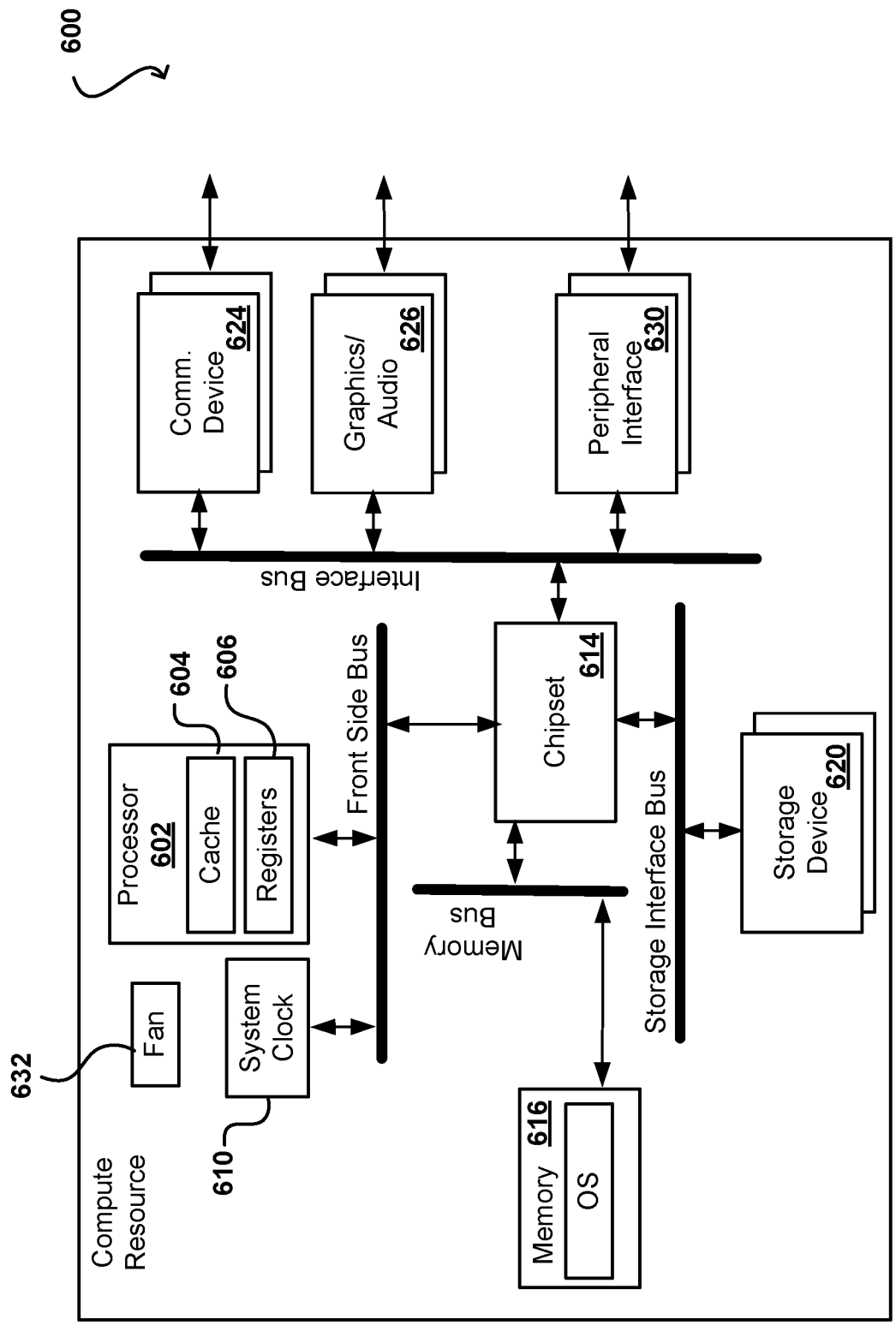
FIG. 6 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 6 illustrates components of an example computing resource 600 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 600 (e.g., a desktop or network server) will have one or more processors 602, such as central processing units (CPUs), graphics processing units (GPUs), and the like, that are electronically and/or communicatively coupled with various components using various buses, traces, and other such mechanisms. A processor 602 can include memory registers 606 and cache memory 604 for holding instructions, data, and the like. In this example, a chipset 614, which can include a northbridge and southbridge in some embodiments, can work with the various system buses to connect the processor 602 to components such as system memory 616, in the form or physical RAM or ROM, which can include the code for the operating system as well as various other instructions and data utilized for operation of the computing device. The computing device can also contain, or communicate with, one or more storage devices 620, such as hard drives, flash drives, optical storage, and the like, for persisting data and instructions similar, or in addition to, those stored in the processor and memory. The processor 602 can also communicate with various other components via the chipset 614 and an interface bus (or graphics bus, etc.), where those components can include communications devices 624 such as cellular modems or network cards, media components 626, such as graphics cards and audio components, and peripheral interfaces 630 for connecting peripheral devices, such as printers, keyboards, and the like. At least one cooling fan 632 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 602 can obtain data from physical memory 616, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 604 in at least some embodiments. The computing device 600 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 630, a communication device 624, a graphics or audio card 626, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 602 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/(O adapter device. In some embodiments, the I/O adapter device is attached externally to the host device. In some embodiments, the IVO adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("CPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and LBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining a set of transcodes for a contribution video stream;
   determining, based on the transcodes, respective values for a set of format parameters of different output streams;
   determining, from the respective values, a set of common format parameter values for the different output streams;
   receiving the set of common format parameter values at an encoder; and
   adjusting, using the encoder, the set of format parameters to correspond to the set of the common format parameter values for encoding the contribution video stream.

2. The computer-implemented method of claim 1, wherein the respective values include video format parameters used to transcode the different output streams.

3. The computer-implemented method of claim 1, wherein the set of common format parameter values include a set of lowest common values for video format parameters used for the transcoding, wherein the adjusting comprises automatically adjusting a value of at least one parameter of the set of format parameters.

4. The computer-implemented method of claim 3, wherein a subsequent portion of the contribution video stream is encoded using the adjusted value.

5. The computer-implemented method of claim 1, wherein the contribution video stream requires less bandwidth for transmission after adjusting the value of the at least one parameter.

6. A computer-implemented method, comprising:
  determining a plurality of transcodes to be performed for a contribution data stream to generate a plurality of output streams in different formats;
  determining, based on the transcodes, respective values for a set of format parameters of the plurality of output streams;
  determining, from the respective values, a set of common format parameter values for the plurality of output streams; and
  adjusting, using an encoder, the set of format parameters to be used to encode the contribution data stream.

7. The computer-implemented method of claim 6, wherein frames of the contribution video stream are compressed for high quality video transmission with limited bandwidth for transmission of the contribution video stream to a server, the server comprising a cloud server provided by a resource provider in a resource provider environment.

8. The computer-implemented method of claim 6, wherein the contribution video stream requires less bandwidth for transmission after the adjusting of the set of format parameters.

9. The computer-implemented method of claim 6, further comprising:
  inferring, based in part on current network conditions, an optimal set of values for the set of common format parameter values by reducing one or more of the respective values to conserve bandwidth while increasing one or more other respective values to use at least a portion of that bandwidth to provide high quality output.

10. The computer-implemented method of claim 6, further comprising:
  determining the set of common format parameter values using the lowest common values of the respective values; and
  adjusting the set of format parameters to correspond to the lowest common values based on a difference between the set of common format parameter values and values associated with the set of format parameters.

11. The computer-implemented method of claim 10, further comprising:
  updating the set of format parameters to correspond to the set of common format parameter values based on at least one of performance capabilities of a client device or a template.

12. The computer-implemented method of claim 6, further comprising:
  adjusting using the encoder the set of format parameters based on restrictions or policies with respect to the plurality of output streams in different formats.

13. The computer-implemented method of claim 6, further comprising a multi-tenant resource environment, wherein a client device submits a request associated with the contribution video stream to the multi-tenant resource provider environment.

14. The computer-implemented method of claim 6, further comprising:
  automatically adjusting a value of at least one parameter of the set of format parameters, to cause the set of format parameters to correspond to the lowest common values of the respective values, wherein a subsequent portion of the contribution video stream is encoded using the adjusted value.

15. A system, comprising:
  at least one processor; and
  memory including instructions that, when executed by the at least one processor cause a server to:
    receive a request associated with a contribution video stream from a client device;
    determine a set of transcodes for the contribution video stream;
    determine, based in part on the transcodes, respective values for a set of format parameters of different output streams; and
    adjust the set of format parameters to correspond to a set of common format parameter values for encoding the contribution video stream.

16. The system of claim 15, wherein the instructions when executed further cause the server to:
  update the set of format parameters to correspond to the set of common format parameter values based on at least one of performance capabilities of the client device or a template.

17. The system of claim 15, wherein the instructions when executed further cause the server to:
  determine the set of common format parameter values using the lowest common values of the respective values.

18. The system of claim 15, wherein the instructions when executed further cause the server to:
  determine the common set of format parameters using the lowest common values from the respective values; and
  adjust the set of format parameters to correspond to the lowest common values based on a difference between the set of common format parameter values and values associated with the set of format parameters.

19. The system of claim 15, wherein the instructions when executed further cause the server to:
  adjust the set of format parameters based on restrictions or policies with respect to the plurality of output streams in different formats.

20. The system of claim 15, wherein the instructions when executed further cause the server to:
  automatically adjust a value of at least one parameter of the set of format parameters, to cause the set of format parameters to correspond to the lowest common values from the respective values, wherein a subsequent portion of the contribution video stream is encoded using the adjusted value.

* * * * *